(12) United States Patent
Visco et al.

(10) Patent No.: US 7,070,632 B1
(45) Date of Patent: Jul. 4, 2006

(54) ELECTROCHEMICAL DEVICE SEPARATOR STRUCTURES WITH BARRIER LAYER ON NON-SWELLING MEMBRANE

(75) Inventors: Steven J. Visco, Berkeley, CA (US); Bruce D. Katz, Berkeley, CA (US)

(73) Assignee: PolyPlus Battery Company, Berkeley, CA (US)

( * ) Notice: Subject to any disclaimer, the term of this patent is extended or adjusted under 35 U.S.C. 154(b) by 131 days.

(21) Appl. No.: 10/193,652

(22) Filed: Jul. 9, 2002

Related U.S. Application Data

(60) Provisional application No. 60/307,981, filed on Jul. 25, 2001.

(51) Int. Cl.
*H01M 6/14* (2006.01)
*H01M 6/22* (2006.01)
*H01M 2/16* (2006.01)

(52) U.S. Cl. .................. 29/623.3; 429/142; 429/144; 429/247; 429/316; 429/231.95

(58) Field of Classification Search ......... 428/231.95, 428/231.9, 142, 144, 145, 247, 248, 307, 428/316, 48; 29/623.3
See application file for complete search history.

(56) References Cited

U.S. PATENT DOCUMENTS

| | | | | |
|---|---|---|---|---|
| 4,296,185 A | * | 10/1981 | Catanzarite | 429/48 |
| 4,707,422 A | * | 11/1987 | de Neufville et al. | 429/48 |
| 5,318,600 A | * | 6/1994 | Schlaikjer et al. | 29/623.5 |
| 5,332,631 A | * | 7/1994 | Abraham et al. | 429/48 |
| 5,858,264 A | * | 1/1999 | Ichino et al. | 252/62.2 |

* cited by examiner

*Primary Examiner*—Tracy Dove
(74) *Attorney, Agent, or Firm*—Beyer Weaver & Thomas LLP

(57) ABSTRACT

Disclosed are electrochemical device separator structures which include a substantially impervious active metal ion conducting barrier layer material, such as an ion conducting glass, is formed on an active metal ion conducting membrane in which elongation due to swelling on contact with liquid electrolyte is constrained in at least two of three orthogonal dimensions of the membrane. The non-swelling character of the membrane prevents elongation in the x-y (or lateral, relative to the layers of the composite) orthogonal dimensions of the membrane when it is contacted with liquid electrolyte that would otherwise cause the barrier layer to rupture. Substantial swelling of the membrane, if any, is limited to the z (or vertical, relative to the layers of the composite) dimension.

23 Claims, 5 Drawing Sheets

As Coated

Post Swelling

As Coated

Post Swelling

ELECTROCHEMICAL DEVICE SEPARATOR STRUCTURES WITH BARRIER LAYER ON NON-SWELLING MEMBRANE

CROSS-REFERENCE TO RELATED APPLICATIONS

This application claims priority to U.S. Provisional Patent Application No. 60/307,981, filed Jul. 25, 2001 and titled PROTECTED ANODE USING NON-SWELLING MEMBRANE. This provisional patent application is incorporated herein by reference for all purposes.

In addition, this application is related to U.S. patent application Ser. No. 09/086,665 filed May 29, 1998, now U.S. Pat. No. 6,025,094 issued: Feb. 15, 2000, titled PROTECTIVE COATINGS FOR NEGATIVE ELECTRODES, and naming Steven J. Visco and May-Ying Chu as inventors. This application is also related to U.S. patent application Ser. No. 09/139,603 filed Aug. 25, 1998, now U.S. Pat. No. 6,402,795 issued: Jun. 11, 2002, titled "PLATING METAL NEGATIVE ELECTRODES UNDER PROTECTIVE COATINGS," and naming May-Ying Chu, Steven J. Visco and Lutgard C. DeJonghe as inventors. This application is also related to U.S. patent application Ser. No. 09/139,601 filed Aug. 25, 1998, now U.S. Pat. No. 6,214,061 issued: Apr. 10, 2001, titled "METHOD FOR FORMING ENCAPSULATED LITHIUM ELECTRODES HAVING GLASS PROTECTIVE LAYERS," and naming Steven J. Visco and Floris Y. Tsang as inventors. Each of these patent applications is incorporated herein by reference for all purposes.

BACKGROUND OF THE INVENTION

1. Field of the Invention

The present invention relates generally to electrodes for use in batteries. More particularly, this invention relates to methods of forming alkali metal electrodes having a reinforced glassy protective layers.

2. Description of Related Art

In theory, some alkali metal electrodes could provide very high energy density batteries. The low equivalent weight of lithium renders it particularly attractive as a battery electrode component. Lithium provides greater energy per volume than the traditional battery standards, nickel and cadmium. Unfortunately, no rechargeable lithium metal batteries have yet succeeded in the market place.

The failure of rechargeable lithium metal batteries is largely due to cell cycling problems. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits which can dislodge from the negative electrode and thereby reduce the battery's capacity.

To address lithium's poor cycling behavior in liquid electrolyte systems, some researchers have proposed coating the electrolyte facing side of the lithium negative electrode with a "protective layer." Such protective layer must conduct lithium ions, but at the same time prevent contact between the lithium electrode surface and the bulk electrolyte. Many techniques for applying protective layers have not succeeded.

Some contemplated lithium metal protective layers are formed in situ by reaction between lithium metal and compounds in the cell's electrolyte which contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Various pre-formed lithium protective barrier layers have been contemplated. For example, U.S. Pat. No. 5,314,765 (issued to Bates on May 24, 1994) describes an ex situ technique for fabricating a lithium electrode containing a thin layer of sputtered lithium phosphorus oxynitride ("LiPON") or related material. LiPON is a glassy single ion conductor (conducts lithium ion) which has been studied as a potential electrolyte for solid state lithium microbatteries that are fabricated on silicon and used to power integrated circuits (See U.S. Pat. Nos. 5,597,660, 5,567,210, 5,338, 625, and 5,512,147, all issued to Bates et al.).

One difficulty encountered with providing such glassy electrolyte/protective barrier layers for the protection of lithium electrodes in battery cells is that the battery cell components on which the protective layer may be formed are not generally dimensionally stable, particularly where liquid electrolyte systems are used. For example, conventional polymeric electrode separator materials, such as porous polyolefins (e.g., CELGARD materials), polyacrylonitrile, etc., take up solvent and swell when contacted with liquid electrolyte. Such swelling results in elongation of the separator along its orthogonal x, y and z axes. As a result of this elongation in the x and y dimensions, a glassy protective layer formed on the surface of the separator is liable to crack and break into islands, thereby destroying its protective function.

It would desirable to be able to form separators coated with ionically conductive glassy electrolyte/protective layers and integrated lithium electrodes/separators with such glassy protective coatings as battery cell components in which the glassy protective layers would not be fractured when these components are subsequently incorporated into battery cells and brought into contact with liquid electrolytes.

Accordingly, improved methods and structures for providing protected lithium (or other active metal) electrodes for use in batteries would be desirable.

SUMMARY OF THE INVENTION

The present invention provides electrochemical device separator structures which include a substantially impervious active metal ion conducting barrier layer material, such as an ion conducting glass, is formed on an active metal ion conducting membrane in which elongation due to swelling on contact with liquid electrolyte is constrained in at least two of three orthogonal dimensions of the membrane. Suitable membrane materials include fiber-reinforced polymers, such as polyvinylidene fluoride (PVDF) reinforced with polytetrafluorethylene (PTFE) fibers, and ionomeric polymers, such as a per-fluoro-sulfonic acid polymer film (e.g., du Pont NAFION)), reinforced with PTFE fibers, for example the product Gore-Select. Non-fiber-reinforced materials, such as porous polyolefin membranes impregnated with an ionically conductive material may also be used. These membranes are sometimes referred to referred to herein as "non-swelling membranes." These composite materials may be advantageously incorporated into active metal electrochemical structures, such as, for example lithium metal batteries and components, where the barrier layer prevents deleterious reaction between active metal ions and separator membrane. The non-swelling character of the membrane constrains elongation in the x-y dimensions of the membrane when it is contacted with liquid electrolyte that would otherwise cause the barrier layer to rupture.

Thus, structures in accordance with the present invention provide robust barrier layers on non-swelling separator material membranes. The structures of the invention may further incorporate an active metal negative electrode and current collector on the barrier layer to create an integrated anode/separator structure that can subsequently be incorporated into a battery cell by pairing with a suitable positive electrode, such as an active sulfur electrode. Such a battery cell may include a liquid electrolyte without risk to the integrity of the barrier layer (and therefore the cell performance) and may include, but may not require, an additional separator beyond the non-swelling separator material membranes.

In one aspect, the invention pertains to an electrochemical device separator structure. The structure includes a separator having a layer of a membrane material characterized in that elongation due to swelling on contact with liquid electrolyte is constrained in at least two of three orthogonal dimensions of the membrane material. The structure further includes a substantially impervious barrier layer on the membrane material layer. Both the separator and barrier layer are conductive to ions of an active metal. The structure may be combined with further elements to form integrated separator/anodes and battery cells.

In another aspect, the invention pertains to method of fabricating an electrochemical device separator structure. The method involves forming a substantially impervious barrier layer on a layer of a membrane material characterized in that elongation due to swelling on contact with liquid electrolyte is constrained in at least two of three orthogonal dimensions of the material. Both the membrane material layer and the barrier layer are conductive to ions of an active metal. In alternative embodiments, a negative electrode may be formed on the barrier layer to produce an integrated separator/anode structure. In another embodiment, a positive electrode may be formed on the barrier layer and a battery cell formed.

These and other features of the invention will be further described and exemplified in the drawings and detailed description below.

DETAILED DESCRIPTION OF SPECIFIC EMBODIMENTS

Figure 1:
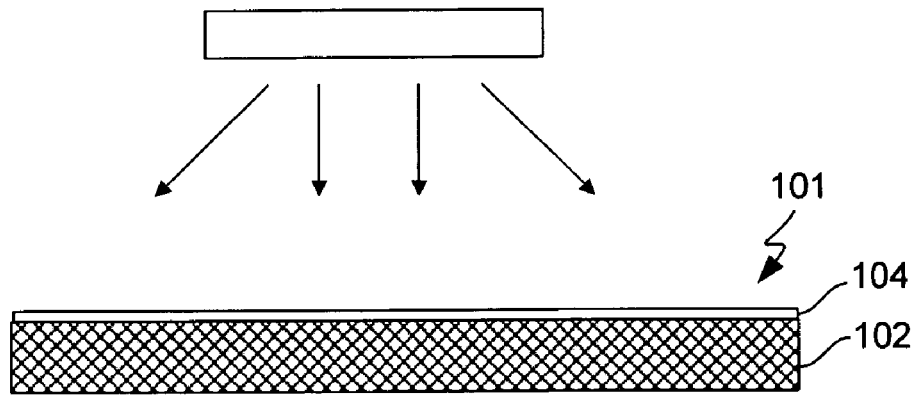
FIG. 1 is a schematic illustrations of the formation of a separator structure according to a one embodiment of the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

When used in combination with "comprising," "a method comprising," "a structure comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Introduction

The present invention provides electrochemical device separator structures which include a substantially impervious active metal ion conducting barrier layer material, such as an ion conducting glass, is formed on an active metal ion conducting membrane in which elongation due to swelling on contact with liquid electrolyte is constrained in at least two of three orthogonal dimensions of the membrane. Suitable membrane materials include fiber-reinforced polymers such as PVDF reinforced with fibers of polytetrafluorethylene (PTFE), polyolefins, such as polyethylene and polypropylene, or polyethylene terephthalate. In a specific embodiment, ionomeric polymers, such as a per-fluoro-sulfonic acid polymer film (e.g., du Pont NAFION)), reinforced with polytetrafluorethylene fibers, for example the product GORE-SELECT, available from W. L. Gore and Associates, are used. Dimensionally stable non-fiber-reinforced materials, such as porous polyolefin membranes, impregnated with an ionically conductive material may also be used. All of these membranes are sometimes referred to referred to herein as "non-swelling membranes." These composite materials may be advantageously incorporated into active metal electrochemical structures, such as, for example lithium metal batteries and components, where the barrier layer prevents deleterious reaction between active metal ions and separator membrane. The non-swelling character of the membrane prevents elongation in the x-y (or lateral, relative to the layers of the composite) orthogonal dimensions of the membrane when it is contacted with liquid electrolyte that would otherwise cause the barrier layer to rupture. Substantial swelling of the membrane, if any, is limited to the z (or vertical, relative to the layers of the composite) dimension.

Thus, structures in accordance with the present invention provide robust barrier layers on non-swelling separator material membranes. The structures of the invention may further incorporate an active metal negative electrode and current collector on the barrier layer to create an integrated anode/separator structure that can subsequently be incorporated into a battery cell by pairing with a suitable positive electrode, such as an active sulfur electrode. Such a battery cell may include a liquid electrolyte without risk to the integrity of the barrier layer (and therefore the cell performance) and may include, but may not require, an additional separator beyond the non-swelling separator material membranes.

The present invention involves providing a substantially impervious ion-conducting barrier layer (i.e., a sufficient barrier to battery solvents and other materials that would be damaging to an active metal electrode material to prevent any such damage that would degrade electrode performance from occurring when the barrier is disposed between an active metal electrode and such materials) on an at least two-dimensionally constrained membrane (elongation constrained in at least two orthogonal dimensions). For example, a suitable barrier layer may be a glass, such as lithium phosphorus oxynitride (LiPON) and more highly conductive sulfide glasses such as $Li_2S$—$GeS_2$, $LiI$—$Li_2S$—$P_2S_5$, and $Li_2S$—$Li_3PO_4$—$SiS_2$.

Fabrication Methods

In the following description, the invention is presented in terms of certain specific compositions, configurations, and processes to help explain how it may be practiced. The invention is not limited to these specific embodiments. For example, while much of the following discussion focuses on lithium systems, the invention pertains more broadly to other active metal battery systems as well (e.g., batteries having negative electrodes of alkali metals, alkaline earth metals, and certain transition metals).

FIGS. 1–4 illustrate a specific fabrication process for an electrochemical device separator structure 101 in accordance with the present invention. Referring first to FIG. 1, an at least two-dimensionally stable porous membrane 102 is used as a substrate for deposition of a thin glass barrier/electrolyte 104. Both the membrane and the barrier layer are ionically conductive, preferably to a single active metal ion. The membrane may be for example, a gel type polymer such as polyvinylidene fluoride (PVDF) or polyacrylonitrile (PAN) and reinforced with non-swelling fibers or porous polymer sheet, for example composed of PTFE or other polymer as noted above. The membrane may also be, for example, a microporous polyolefin membrane impregnated with an ionically conductive material such as a gel-type polymer electrolyte, for example, PVDF, or an ionomer, for example, a per-fluoro-sulfonic acid polymer, polyacrylic acid or polysulfonic acid to confer ionic conductivity to the porous non-swelling membrane. In a specific embodiment, the membrane may be a fiber reinforced ionomeric polymer membrane, for example a PTFE fiber reinforced proton exchange membrane (PEM), e.g., a per-fluoro-sulfonic acid polymer film.

The base membrane may be a highly porous/permeable material such as is conventionally used as separators in battery cells, generally, but not necessarily polymeric. It should also resist attack by the electrolyte and other cell components under the potentials experienced within the cell. Examples of suitable separators include porous polymer membranes known to those in the art such as porous polyolefin materials (polyethylene, polypropylene or combination) marketed under the trade name CELGARD (e.g., CELGARD 2300 or CELGARD 2400) available from Hoechst Celanese of Dallas, Tex.

Where the membrane is reinforced, it should be understood that the reinforcement material may take a number of forms including fibers as noted above, but also and punched sheets and woven mats or mesh.

Particularly suitable porous membrane materials are fiber reinforced ionomeric polymers available from several commercial sources, including the product GORE-SELECT (available from Gore) in which a composite of NAFION (a per-fluoro-sulfonic acid polymer) and PTFE fibers make up a thin conductive membrane, which when exposed to solvent expands mainly in the z-direction and very little in the x-y direction. In this way solvent uptake of the membrane does not rupture the thin glass film deposited on the membrane.

NAFION may be represented by the chemical formula:

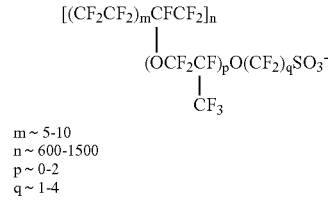

$m \sim 5\text{-}10$
$n \sim 600\text{-}1500$
$p \sim 0\text{-}2$
$q \sim 1\text{-}4$ Nafion can also be represented by:

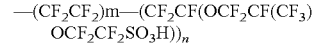

where m is 5 to 10 typically, and n can be very large, for example, up to 1000 and more. Similar materials are available from other manufactures, including Dow Chemical Co., Asahi Chemical Co., and Chloride Engineers Ltd. NAFION is a single ion conducted for a number of active metals including alkali metals, alkaline earth metals or certain transition metals as described more fully in the prior applications of the present inventors previously incorporated by reference herein. Further information on this material and techniques for forming materials of this type may be found in "A First Course in Ion Permeable Membranes," by Thomas A. Davis, J. David Genders and Derek Pletcher, and U.S. Pat. No. 4,661,411 "Method For Depositing A Fluorocarbonsulfonic Acid Polymer From A Solution" Apr. 28, 1987; Inventors: C. W. Martin, B. R. Ezzell, J. D. Weaver; Assigned to Dow Chemical Co., Midland Mich., both of which are incorporated herein by reference in their entirety for all purposes. In specific embodiments, the active metal used in structures of the present invention may be lithium, sodium or potassium or alloys thereof. Lithium and alloys thereof are particularly preferred.

One advantageous feature of NAFION and the like ionomeric membranes is that they can carry charge without the addition of a salt. NAFION can be ion exchanged and thereby be an ionic conductor (e.g., of lithium). When undergoing ion exchange the sulfonic acid exchanges its hydrogen for a positively charged ion (e.g., Li+) in solution. The chemical formula for the Li+ ion exchange reaction with NAFION is:

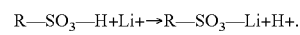

In the case of a lithium-sulfur battery, this ionomeric characteristic allows for ionic conductivity while preventing polysulfides from reaching the glass barrier where they could deleteriously react with Li and cause the glass to delaminate from the membrane.

Fiber reinforced membranes in accordance with the present invention may have a thickness between about 20 and 100 microns. The thickness may be as low as 20 microns without risking the structural integrity of the membrane due to the strength conferred by the fibrous reinforcement.

Figure 2:
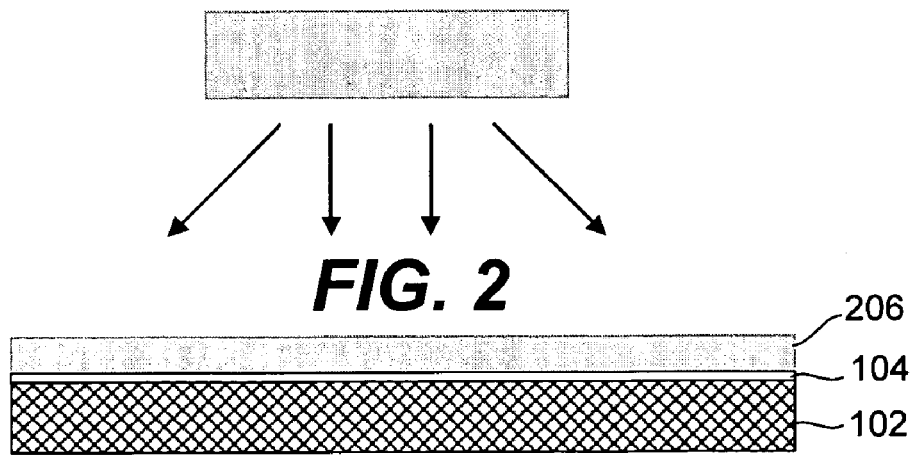
FIGS. 2–4 are schematic illustrations of the formation of an integrated separator/anode structure according to a one embodiment of the present invention.
Figure 3:
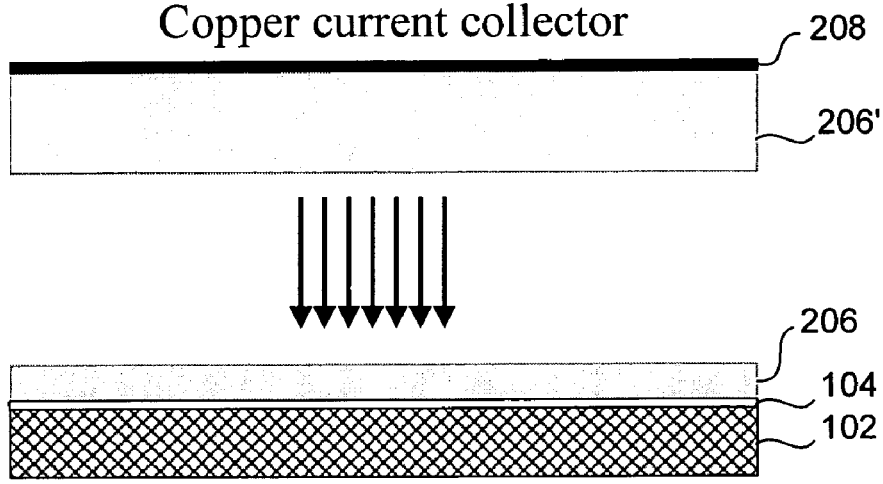
Figure 4:
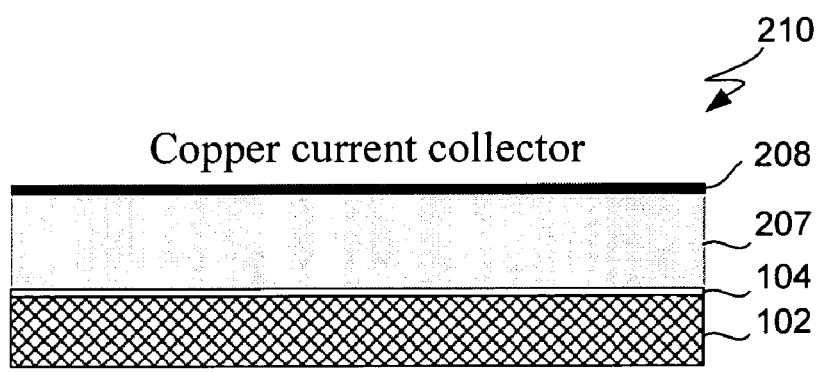

Referring to FIGS. 2–4, the structure of FIG. 1 may be added to to form an integrated separator/anode structure 210. As shown in FIG. 2, a negative electrode (anode) material (Li, Na, etc.) or a bonding layer (Al, Sn, etc.) 206 could be deposited by evaporation (or other appropriate deposition technique such as are know to those of skill in the art) onto the glass barrier layer 104. The glass layer 104 prevents direct interaction of the highly reducing anode 206 with the microporous membrane 102 and/or liquid electrolyte therein.

Referring to FIG. 3, a technique for laminating an electrode to the electrode material or bonding layer 206 is shown. A layer of lithium 206' on a copper current collector 208 is contacted and bound with the electrode material/bonding layer 206. The resulting structure 210 shown in FIG. 4 in which the ionomeric membrane 102, such as PTFE fiber reinforced NAFION (ion-exchanged to the Li form), is protected against reaction with the metallic Li electrode 207 by the glassy barrier layer 104. The lithium (or other active metal) electrode is in turn protected from ambient by the bound current collector 208.

The current collector includes a first surface which is exposed to the ambient and a second surface which intimately contacts the active metal electrode layer. The active metal electrode includes a first surface which forms the interface with the current collector and a second surface which intimately contacts the protective layer. In turn, the protective layer includes a first surface which contacts the second surface of the active metal electrode and a second surface which contacts the ionomeric membrane. The interfaces at the surfaces of the active metal electrode should be sufficiently continuous or intimate that moisture, air, electrolyte, and other agents from the ambient are prevented from contacting the active metal. In addition, the interface the active metal electrode and the current collector should provide a low resistance electronic contact. Finally, the interface between the active metal and the protective layer should provide a low resistance ionic contact.

Preferably, the current collectors employed with this invention form a physically rigid layer of material that does not alloy with active metal (e.g., lithium). They should be electronically conductive and unreactive to moisture, gases in the atmosphere (e.g., oxygen and carbon dioxide), electrolytes and other agents they are likely to encounter prior to, during, and after fabrication of a battery. Examples of materials useful as current collectors for this invention include copper, nickel, many forms of stainless steel, zinc, chromium, and compatible alloys thereof. The current collector should not alloy with, easily migrate into, or otherwise detrimentally effect the electrochemical properties of the active metal alloy layer. This also ensures that the current collector material does not redistribute during the charge and discharge cycles in which active metal is alternately plated and electrolytically consumed. The thickness of the current collector depends upon the material from which it is made. For many embodiments of interest, the current collector is between about 1 and 25 micrometers thick, more preferably between about 6 and 12 micrometers thick.

The current collector may be provided as a metallized plastic layer. In this case, the current collector may be much thinner than a free-standing current collector. For example, the metal layer on plastic may be in the range of 500 angstroms to 1 micrometer in thickness. Suitable plastic backing layers for use with this type of current collector include polyethylene terephthalate (PET), polypropylene, polyethylene, polyvinylchloride (PVC), polyolefins, polyimides, etc. The metal layers put on such plastic substrates are preferably inert to lithium (e.g., they do not alloy with lithium) and may include at least those materials listed above (e.g., copper, nickel, stainless steel, and zinc). One advantage of this design is that it forms a relatively lightweight backing/current collector for the electrode.

The current collector may be prepared by a conventional technique for producing current collectors. The current collectors may be provided as sheets of the commercially available metals or metallized plastics. The surfaces of such current collectors may be prepared by standard techniques such as electrode polishing, sanding, grinding, and/or cleaning. Alternatively, the current collector metals may be formed by a more exotic technique such as evaporation of the metal onto a substrate, physical or chemical vapor deposition of the metal on a substrate, etc. Such processes may be performed as part of a continuous process for constructing the structure. Each step in the continuous process would be performed under vacuum.

The integrated structure 210 may not need a separate separator when incorporated into a battery cell. The use of Li-NAFION or other related ionomer also has the advantage of single-ion conduction, and lack of concentration polarization during cell operation. The use of an at least two dimensionally stable membrane support for the protective layer, such as described, protects the protective layer (e.g., glass film) against expansion which may crack the protective layer. The protective layer protects the microporous membrane against reaction with lithium.

The integrated anode/separator structure may be incorporated into a lithium metal battery cell by pairing with a suitable positive electrode, such as an active sulfur electrode, such as described in U.S. Pat. No. 5,686,201 titled RECHARGEABLE POSITIVE ELECTRODES, issued Nov. 11, 1997, incorporated by reference here in its entirety and for all purposes. As noted above, and described further below with reference to FIG. 5, such a battery cell may include a liquid electrolyte without risk to the integrity of the barrier layer (and therefore the cell performance) and may include, but may not require, an additional separator beyond the non-swelling separator material membranes.

Preferably, the entire fabrication process described above is conducted in a continuous fashion and under a vacuum. This ensures a high throughput for manufacturing and clean fresh surfaces for forming each layer of the laminate.

Most generally, the lithium metal with which the invention is most often described above can be replaced with any metal, any mixture of metals capable of functioning as a negative electrode. However, the protective layers of this invention will find most use in protecting alloys of highly reactive metals such as alkali metals and alkaline earth metals. The thickness of the metal layer used in the electrodes of this invention depends upon the cell construction, the desired cell capacity, the particular metal employed, etc. For many applications, the active metal alloy thickness will preferably lie between about one and one hundred micrometers.

In one preferred embodiment, the materials for the negative electrodes include a metal such lithium or sodium or an alloy of one of these with one or more additional alkali metals and/or alkaline earth metals. Preferred alloys include lithium aluminum alloys, lithium silicon alloys, lithium tin alloys, and sodium lead alloys (e.g., $Na_4Pb$). Other metallic electrode materials may include alkaline earth metals such as magnesium and their alloys, aluminum, and transition metals such as, zinc, and lead and their alloys. The protective layer must be made from a compatible material. The material should be conductive to ions of the electrochemically active metal or metals in the negative electrode.

Protective Layer Composition

The protective layer serves to protect the active metal alloy in the electrode during cell cycling. It should protect the active metal alloy from attack from the electrolyte and reduce formation of dendrites and mossy deposits. In addition, protective layer should be substantially impervious to agents from the ambient. Thus, it should be free of pores, defects, and any pathways allowing air, moisture, electrolyte, and other outside agents to penetrate though it to the active metal alloy layer. In this regard, the composition, thickness, and method of fabrication may all be important in imparting the necessary protective properties to the protective layer. These features of the protective layer will be described in further detail below.

Preferably, the protective layer is so impervious to ambient moisture, carbon dioxide, oxygen, etc. that a lithium alloy electrode can be handled under ambient conditions without the need for elaborate dry box conditions as typically employed to process other lithium electrodes. Because the protective layer described herein provides such good protection for the lithium (or other active metal), it is contemplated that electrodes and electrode/electrolyte composites of this invention may have a quite long shelf life outside of a battery. Thus, the invention contemplates not only batteries containing a negative electrode, but unused negative electrodes and electrode/electrolyte laminates themselves. Such negative electrodes and electrode/electrolyte laminates may be provided in the form of sheets, rolls, stacks, etc. Ultimately, they are integrated with other battery components to fabricate a battery. The enhanced stability of the batteries of this invention will greatly simplify this fabrication procedure.

The protective layer should be a glass or amorphous material that conducts lithium (or other active metal) ion but does not significantly conduct other ions. In other words, it should be a single ion conductor. It should also be stable for the voltage window employed in the cell under consideration. Still further it should be chemically stable to a battery electrolyte, at least within the voltage window of the cell. Finally, it should have a high ionic conductivity for the lithium (or other active metal) ion.

The protective layer may be formed directly on a carrier or electrolyte by any suitable process. It can be deposited on these substrates by techniques such as physical vapor deposition and chemical vapor deposition. In a preferred embodiment, it is deposited by plasma enhanced chemical vapor deposition (PECVD). Examples of suitable physical vapor deposition processes include sputtering and evaporation (e.g., electron-beam evaporation). A PECVD technique is described in U.S. patent application Ser. No. 09/086,665, filed on May 19, 1998, and titled PROTECTIVE COATINGS FOR NEGATIVE ELECTRODES, which was previously incorporated herein by reference. In another preferred embodiment the protective layer is deposited by electron beam evaporation.

The protective layer is preferably composed of a glass or amorphous material that is conductive to metal ions of the negative electrode metal. Preferably, the protective layer does not conduct anions such as $S_8^=$ generated on discharge of a sulfur electrode (or other anions produced with other positive electrodes), or anions present in the electrolyte such as perchlorate ions from dissociation of lithium perchlorate.

In order to provide the needed ionic conductivity, the protective layer typically contains a mobile ion such as a metal cation of the negative electrode metal. Many suitable single ion conductors are known. Among the suitable glasses are those that may be characterized as containing a "modifier" portion and a "network former" portion. The modifier is often an oxide of the active metal in (i.e., the metal ion to which the protective layer is conductive). The network former is often a polymeric oxide or sulfide. One example is the lithium silicate glass $2\ Li_2O.1\ SiO_2$ and another example is the sodium borosilicate glass $2\ Na_2O.1\ SiO_2.2B_2O_3$.

The modifier/network former glasses employed in this invention may have the general formula $(M_2O)X(A_nD_m)$, where M is an alkali metal, A is boron, aluminum, silicon, or phosphorous, D is oxygen or sulfur. The values of n and m are dependent upon the valence on A. X is a coefficient that varies depending upon the desired properties of the glass. Generally, the conductivity of the glass increases as the value of X decreases. However, if the value of X becomes too small, separate phases of the modifier and network former arise. Generally, the glass should remain of a single phase, so the value of X must be carefully chosen.

The highest concentration of $M_2O$ should be that which yields the stoichiometry of the fully ionic salt of the network former. For instance $SiO_2$ is a polymeric covalent material; as $Li_2O$ is added to silica O—O bonds are broken yielding Si—O $Li^+$. The limit of $Li_2O$ addition is at the completely ionic stoichiometry, which for silica would be $Li_4SiO_4$, or $2Li_2O.SiO_2$ ($Li_2O.0.5SiO_2$). Any addition of $Li_2O$ beyond this stoichiometry would necessarily lead to phase separation of $Li_2O$ and $Li_4SiO_4$. Phase separation of a glass composition typically happens well before the fully ionic composition, but this is dependent on the thermal history of the glass and cannot be calculated from stoichiometry. Therefore the ionic limit can be seen as an upper maximum beyond which phase separation will happen regardless of thermal history. The same limitation can be calculated for all network formers, i.e. $Li_3BO_3$ or $3\ Li_2O.B_2O_3$, $Li_3AlO_3$ or $3\ Li_2O.Al_2O_3$, etc. Obviously, the optimum values of X will vary depending upon the modifier and network former employed.

Examples of the modifier include lithium oxide ($Li_2O$), lithium sulfide ($Li_2S$), lithium selenide ($Li_2Se$), sodium oxide ($Na_2O$), sodium sulfide ($Na_2S$), sodium selenide ($Na_2Se$), potassium oxide ($K_2O$), potassium sulfide ($K_2S$), potassium selenide ($K_2Se$), etc., and combinations thereof. Examples of the network former include silicon dioxide ($SiO_2$), silicon sulfide ($SiS_2$), silicon selenide ($SiSe_2$), boron oxide ($B_2O_3$), boron sulfide ($B_2S_3$), boron selenide ($B_2Se_3$), aluminum oxide ($Al_2O_3$), aluminum sulfide ($Al_2S_3$), aluminum selenide ($Al_2Se_3$), phosphorous pentoxide ($P_2O_5$), phosphorous pentasulfide ($P_2S_5$), phosphorous pentaselenide ($P_2Se_5$), phosphorous tetraoxide ($PO_4$), phosphorous tetrasulfide ($PS_4$), phosphorous tetraselenide ($PSe_4$), germanium sulfide ($GeS_2$), gallium sulfide $GaS_2$ and related network formers.

"Doped" versions of the above two-part protective glasses may also be employed. Often the dopant is a simple halide of the ion to which the glass is conductive. Examples include lithium iodide (LiI), lithium chloride (LiCl), lithium bromide (LiBr), sodium iodide (NaI), sodium chloride (NaCl), sodium bromide (NaBr), etc. Such doped glasses may have general formula $(M_2O)X(A_nD_m).Y(MH)$ where Y is a coefficient and MH is a metal halide.

The addition of metal halides to glasses is quite different than the addition of metal oxides or network modifiers to glasses. In the case of network modifier addition, the covalent nature of the glass is reduced with increasing modifier addition and the glass becomes more ionic in nature. The addition of metal halides is understood more in terms of the addition of a salt (MH) to a solvent (the modifier/former glass). The solubility of a metal halide (MH) in a glass will also depend on the thermal history of the glass. In general it has been found that the ionic conductivity of a glass increases with increasing dopant (MH) concentration until the point of phase separation. However, very high concentrations of MH dopant may render the glass hygroscopic and susceptible to attack by residual water in battery electrolytes, therefore it might be desirable to use a graded interface where the halide concentration decreases as a function of distance from the negative electrode surface. One suitable halide doped glass is $Li_2O.YLiCl.XB_2O_3.ZSiO_2$.

Single ion conductor glasses are particularly preferred as a protective layer used with this invention. One example is a lithium phosphorus oxynitride glass referred to as LiPON which is described in "A Stable Thin-Film Lithium Electrolyte: Lithium Phosphorus Oxynitride," J. Electrochem. Soc., 144, 524 (1997) and is incorporated herein by reference for all purposes. An example composition for LiPON is $Li_{2.9}PO_{3.3}N_{0.5}$. Examples of other glass films that may work include $6LiI$—$Li_3PO_4$—$P_2S_5$ and $B_2O_3$—$LiCO_3$—$Li_3PO_4$, and glasses based on $Li_2S$—$GeS_2$, $Li_2S$—$GaS_2$, and $Li_2S$—$Li_3PO_4$—$SiS_2$.

Regarding thickness, protective layer should be as thin as possible while still effectively protecting the active metal alloy electrode. Thinner layers have various benefits. Among these are flexibility and low ionic resistance. If a layer becomes too thick, the electrode cannot bend easily without cracking or otherwise damaging the protective layer. Also, the overall resistance of the protective layer is a function of thickness. However, the protective layer should be sufficiently thick to prevent electrolyte or certain aggressive ions from contacting the underlying alkali metal. The appropriate thickness will depend upon the deposition process. If the deposition process produces a high quality protective layer, then a rather thin layer can be employed. A high quality protective layer will be smooth and continuous and free of pores or defects that could provide a pathway for lithium metal or deleterious agents from the electrolyte.

For many protective layers, the optimal thickness will range between about 50 angstroms and 5 micrometers. More preferably, the thickness will range between about 100 angstroms and 3,000 angstroms. Even more preferably, the thickness will range between about 500 angstroms and 2,000 angstroms. For many high quality protective layers, an optimal thickness will be approximately 1000 angstroms.

In addition, the composition of the protective layer should have an inherently high ionic conductivity (e.g., between about $10^{-8}$ and about $10^{-2}$ $(ohm-cm)^{-1}$). Obviously, if a relatively good quality thin layer can be deposited, a material with a relatively low conductivity may be suitable. However, if relatively thicker layers are required to provide adequate protection, it will be imperative that the composition of the protective layer have a relatively high conductivity.

Battery Design

Batteries of this invention may be constructed according to various known processes for assembling cell components and cells. Generally, the invention finds application in any cell configuration. The exact structure will depend primarily upon the intended use of the battery unit. Examples include thin film with porous separator, thin film polymeric laminate, jelly roll (i.e., spirally wound), prismatic, coin cell, etc.

Generally, batteries employing the negative electrodes of this invention will be fabricated with an electrolyte. It is possible, however, that the protective layer could serve as a solid state electrolyte in its own right. If a separate electrolyte is employed, it may be in the liquid, solid (e.g., polymer), or gel state. It may be fabricated together with the negative electrode as a unitary structure (e.g., as a laminate). Such unitary structures will most often employ a solid or gel phase electrolyte.

The negative electrode is spaced from the positive electrode, and both electrodes may be in material contact with an electrolyte separator. Current collectors contact both the positive and negative electrodes in a conventional manner and permit an electrical current to be drawn by an external circuit. In a typical cell, all of the components will be enclosed in an appropriate casing, plastic for example, with only the current collectors extending beyond the casing. Thereby, reactive elements, such as sodium or lithium in the negative electrode, as well as other cell elements are protected.

Figure 5:
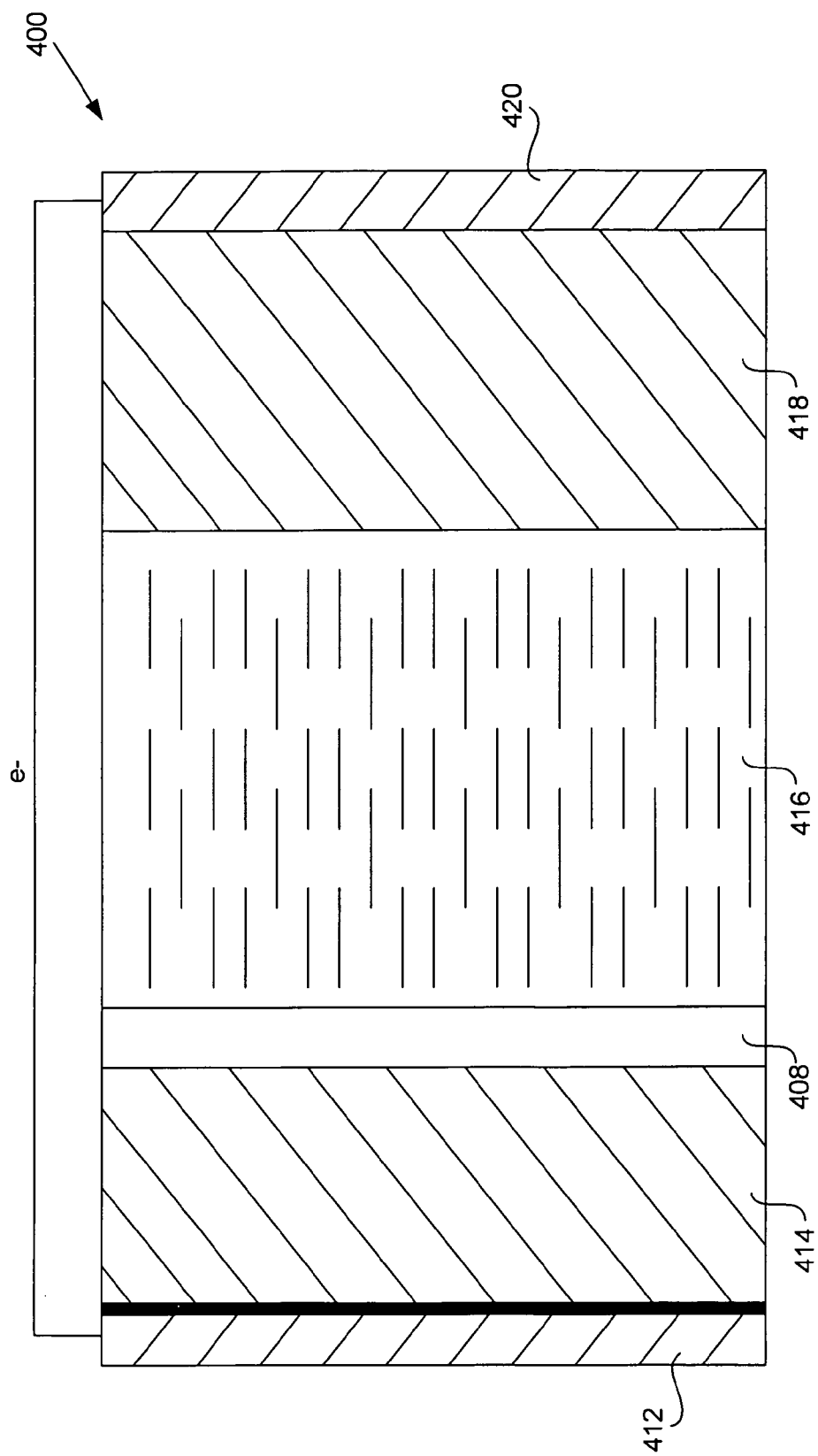
FIG. 5 is a block diagram of a battery formed from a separator structure in accordance with the present invention.

Referring now to FIG. 5, a cell 400 in accordance with a preferred embodiment of the present invention is shown. Cell 400 includes a negative current collector 412 which is formed of an electronically conductive material. The current collector serves to conduct electrons between a cell terminal (not shown) and a negative electrode 414 (such as an active metal alloy) to which current collector 412 is affixed. Negative electrode 414 is made from lithium or other similarly active metal alloy material, and includes a protective layer 408 formed opposite current collector 412. Either negative electrode 414 or protective layer 408 contacts an electrolyte in an electrolyte region 416. The electrolyte may be liquid, gel, or solid (e.g., polymer). To simplify the discussion of FIG. 4, the electrolyte will be referred to as "liquid electrolyte" or just "electrolyte." An example of a solid electrolyte is polyethylene oxide. An example of gel electrode is polyethylene oxide containing a significant quantity of entrained liquid such as an aprotic solvent.

A separator including a non-swelling separator material in accordance with the present invention in region 416 prevents electronic contact between the positive and negative electrodes. A positive electrode 418 abuts the side of separator layer 416 opposite negative electrode 414. As electrolyte region 416 is an electronic insulator and an ionic conductor, positive electrode 418 is ionically coupled to but electronically insulated from negative electrode 414. Finally, the side of positive electrode 418 opposite electrolyte region 416 is affixed to a positive current collector 420. Current collector 420 provides an electronic connection between a positive cell terminal (not shown) and positive electrode 418.

Current collector 420, which provides the current connection to the positive electrode, should resist degradation in the electrochemical environment of the cell and should remain substantially unchanged during discharge and charge. In one embodiment, the current collectors are sheets of conductive material such as aluminum or stainless steel. The positive electrode may be attached to the current collector by directly forming it on the current collector or by pressing a pre-formed electrode onto the current collector. Positive electrode mixtures formed directly onto current collectors preferably have good adhesion. Positive electrode films can also be cast or pressed onto expanded metal sheets. Alternately, metal leads can be attached to the positive electrode by crimp-sealing, metal spraying, sputtering or other techniques known to those skilled in the art. Some positive electrode can be pressed together with the electrolyte separator sandwiched between the electrodes. In order to provide good electrical conductivity between the positive electrode and a metal container, an electronically conductive matrix of, for example, carbon or aluminum powders or fibers or metal mesh may be used.

In some embodiments of the invention, the cell may be characterized as a "thin film" or "thin layer" cell. Such cells possess relatively thin electrodes and electrolyte separators. Preferably, the positive electrode is no thicker than about 300 μm, more preferably no thicker than about 150 μm, and most preferably no thicker than about 100 μm. The negative electrode preferably is no thicker than about 100 μm and more preferably no thicker than about 100 μm. Finally, the electrolyte separator (when in a fully assembled cell) is no thicker than about 100 μm and more preferably no thicker than about 40 μm.

While the above examples are directed to rechargeable batteries, the invention may also find application in primary batteries. Examples of such primary batteries include lithium-manganese oxide batteries, lithium-(CF)$_x$ chloride batteries, lithium sulfur dioxide batteries and lithium iodine batteries. In a particularly preferred embodiment, these primary batteries would be formed in the discharged state; that is, the lithium is plated to the negative electrode in situ. In this embodiment, the primary cells would have extremely long shelf lives because no free lithium is present during the storage and transportation phase.

The protective layer allows one to use an active metal alloy electrode in a manner that resembles the use of lithium ion batteries. Lithium ion batteries were developed because they had a longer cycle life and better safety characteristics than metal lithium batteries. The relatively short cycle life of metallic lithium batteries has been due, in part, to the formation of dendrites of lithium which grow from the lithium electrode across the electrolyte and to the positive electrode where they short circuit the cells. Not only do these short circuits prematurely degrade the cells, they pose a serious safety risk. The protective layer of this invention prevents formations of dendrites and thereby improves the cycle life and safety of metallic lithium batteries. Further, the batteries of this invention will perform better than lithium ion batteries because they do not require a carbon intercalation matrix to support lithium ions. Because the carbon matrix does not provide a source of electrochemical energy, it simply represents dead weight that reduces a battery's energy density. Because the present invention does not employ a carbon intercalation matrix, it has a higher energy density than a conventional lithium ion cell—while providing better cycle life and safety than metallic lithium batteries studied to date. In addition, the lithium metal batteries of this invention do not have a large irreversible capacity loss associated with the "formation" of lithium ion batteries.

Lithium-Sulfur Batteries

Sulfur positive electrodes and metal-sulfur batteries are described in U.S. Pat. No. 5,686,201 issued to Chu on Nov. 11, 1997 and U.S. patent application Ser. No. 08/948,969 naming Chu et al. as inventors, filed on Oct. 10, 1997. Both of these documents are incorporated by reference for all purposes. The sulfur positive electrodes preferably include in their theoretically fully charged state sulfur and an electronically conductive material. At some state of discharge, the positive electrode will include one or more polysulfides and possibly sulfides, which are polysulfides and sulfides of the metal or metals found in the negative electrode. In some embodiments, the fully charged electrode may also include some amount of such sulfides and/or polysulfides.

The positive electrode is fabricated such that it permits electrons to easily move between the sulfur and the electronically conductive material, and permits ions to move between the electrolyte and the sulfur. Thus, high sulfur utilization is realized, even after many cycles. If the lithium-sulfur battery employs a solid or gel state electrolyte, the positive electrode should include an electronic conductor (e.g., carbon) and an ionic conductor (e.g., polyethylene oxide) in addition to the sulfur electroactive material. If the battery employs a liquid electrolyte, the positive electrode may require only an electronic conductor in addition to the sulfur electroactive material. The electrolyte itself permeates the electrode and acts as the ionic conductor. In the case of a liquid electrolyte cell, the battery design may assume two formats: (1) all active sulfur (elemental sulfur, polysulfides and sulfides of the positive electrode) is dissolved in electrolyte solution (one phase positive electrode) and (2) the active sulfur is distributed between a solid phase (sometimes precipitated) and a liquid phase.

When the lithium alloy-sulfur battery cells of this invention include a liquid electrolyte, that electrolyte should keep many or all of sulfur discharge products in solution and therefore available for electrochemical reaction. Thus, they preferably solubilize lithium sulfide and relatively low molecular weight polysulfides. In a particularly preferred embodiment, the electrolyte solvent has repeating ethoxy units ($CH_2CH_2O$). This may be a glyme or related compound. Such solvents are believed to strongly coordinate lithium and thereby increase the solubility of discharge products of lithium-sulfur batteries. Suitable liquid electrolyte solvents are described in more detail in U.S. patent application Ser. No. 08/948,969, previously incorporated by reference.

It should be understood that the electrolyte solvents of this invention may also include cosolvents. Examples of such additional cosolvents include sulfolane, dimethyl sulfone, dialkyl carbonates, tetrahydrofuran (THF), dioxolane, propylene carbonate (PC), ethylene carbonate (EC), dimethyl carbonate (DMC), butyrolactone, N-methylpyrrolidinone, dimethoxyethane (DME or glyme), hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate, N,N,N',N'-tetraethylsulfamide, tetraethylenediamine, tetramethylpropylenediamine, pentamethyldiethylenetriamine, methanol, ethylene glycol, polyethylene glycol, nitromethane, trifluoroacetic acid, trifluoromethanesulfonic acid, sulfur dioxide, boron trifluoride, and combinations of such liquids.

The protective layers employed in this invention may allow the use of electrolyte solvents that work well with sulfides and polysulfides but may attack lithium. Examples of solvents in this category include amine solvents such as diethyl amine, ethylene diamine, tributyl amine, amides such as dimethyl acetamide and hexamethyl phosphoramide (HMPA), etc.

Exemplary but optional electrolyte salts for the battery cells incorporating the electrolyte solvents of this invention include, for example, lithium trifluoromethanesulfonimide ($LiN(CF_3SO_2)_2$), lithium triflate ($LiCF_3SO_3$), lithium perchlorate ($LiClO_4$), $LiPF_6$, $LiBF_4$, and $LiAsF_6$, as well as corresponding salts depending on the choice of metal for the negative electrode, for example, the corresponding sodium salts. As indicated above, the electrolyte salt is optional for the battery cells of this invention, in that upon discharge of the battery, the metal sulfides or polysulfides formed can act as electrolyte salts, for example, $M_{x/z}S$ wherein x=0 to 2 and z is the valence of the metal.

As mentioned, the battery cells of this invention may include a solid-state electrolyte. An exemplary solid-state electrolyte separator is a ceramic or glass electrolyte separator which contains essentially no liquid. Specific examples of solid-state ceramic electrolyte separators include beta alumina-type materials such as sodium beta alumina, Nasicon™ or Lisicon™ glass or ceramic. Polymeric electrolytes, porous membranes, or combinations thereof are exemplary of a type of electrolyte separator to which an aprotic organic plasticizer liquid can be added according to this invention for the formation of a solid-state electrolyte separator generally containing less than 20% liquid. Suitable polymeric electrolytes include polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide.

In the gel-state, the electrolyte separator generally contains at least 20% (weight percentage) of an organic liquid (see the above listed liquid electrolytes for examples), with the liquid being immobilized by the inclusion of a gelling agent. Many gelling agents such as polyacrylonitrile, polyvinylidene difluoride (PVDF), or polyethylene oxide (PEO), can be used.

It should be understood that some systems employing liquid electrolytes are commonly referred to as having "polymer" separator membranes. Such systems are considered liquid electrolyte systems within the context of this invention. The membrane separators employed in these systems actually serve to hold liquid electrolyte in small pores by capillary action. Essentially, a porous or microporous network provides a region for entraining liquid electrolyte. Such separators are described in U.S. Pat. No. 3,351,495 assigned to W. R. Grace & Co. and U.S. Pat. Nos. 5,460,904, 5,540,741, and 5,607,485 all assigned to Bellcore, for example. Each of these patents is incorporated herein by reference for all purposes.

The fully charged state of some cells of this invention need not require that the positive electrode be entirely converted to elemental sulfur. It may be possible in some cases to have the positive electrode be a highly oxidized form of lithium polysulfide, for example, as in $Li_2S_x$ where x is five or greater. The fully charged positive electrode may also include a mixture of such polysulfides together with elemental sulfur and possibly even some sulfide. It should be understood that during charge, the positive electrode would generally not be of uniform composition. That is, there will be some amount of sulfide, sulfur, and an assortment of polysulfides with various values of x. Also, while the electrochemically active material includes some substantial fraction of "sulfur," this does not mean that the positive electrode must rely exclusively upon sulfur for its electrochemical energy.

The electronic conductor in the positive electrode preferably forms an interconnected matrix so that there is always a clear current path from the positive current collector to any position in the electronic conductor. This provides high availability of electroactive sites and maintained accessibility to charge carriers over repeated cycling. Often such electronic conductors will be fibrous materials such as a felt or paper. Examples of suitable materials include a carbon paper from Lydall Technical Papers Corporation of Rochester, N.H. and a graphite felt available from Electrosynthesis Company of Lancaster, N.Y.

The sulfur is preferably uniformly dispersed in a composite matrix containing an electronically conductive material. Preferred weight ratios of sulfur to electronic conductor in the sulfur-based positive electrodes of this invention in a fully charged state are at most about 50:1, more preferably at most about 10:1, and most preferably at most about 5:1.

The sulfur considered in these ratios includes both precipitated or solid phase sulfur as well as sulfur dissolved in the electrolyte. Preferably, the per weight ratio of electronic conductor to binder is at least about 1:1 and more preferably at least about 2:1.

The composite sulfur-based positive electrode may further optionally include performance enhancing additives such as binders, electrocatalysts (e.g., phthalocyanines, metallocenes, brilliant yellow (Reg. No. 3051-11-4 from Aldrich Catalog Handbook of Fine Chemicals; Aldrich Chemical Company, Inc., 1001 West Saint Paul Avenue, Milwaukee, Wis.) among other electrocatalysts), surfactants, dispersants (for example, to improve the homogeneity of the electrode's ingredients), and protective layer forming additives to protect a lithium negative electrode (e.g., organosulfur compounds, phosphates, iodides, iodine, metal sulfides, nitrides, and fluorides). Preferred binders (1) do not swell in the liquid electrolyte and (2) allow partial but not complete wetting of the sulfur by the liquid electrolyte. Examples of suitable binders include Kynar available from Elf Atochem of Philadelphia, Pa., polytetrafluoroethylene dispersions, and polyethylene oxide (of about 900 k molecular weight for example). Other additives include electroactive organodisulfide compounds employing a disulfide bond in the compound's backbone. Electrochemical energy is generated by reversibly breaking the disulfide bonds in the compound's backbone. During charge, the disulfide bonds are reformed. Examples of organodisulfide compounds suitable for use with this invention are presented in U.S. Pat. Nos. 4,833,048 and 4,917,974 issued to DeJonghe et al. and U.S. Pat. No. 5,162,175 issued to Visco et al.

EXAMPLES

The following Examples are provided to illustrate certain aspects of the present invention. The Examples will serve to further illustrate the invention but are not meant to limit the scope of the invention in any way.

Example 1

Comparative Mechanical Stability

Figure 6A:
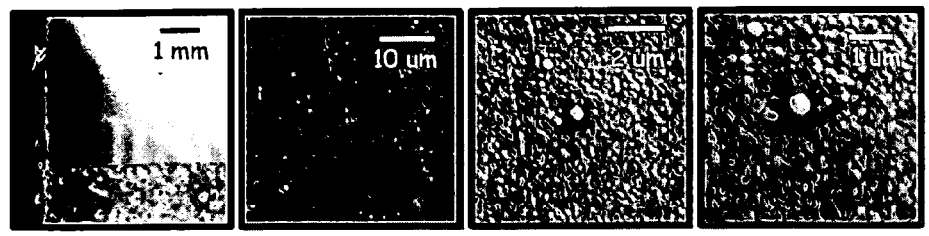
FIGS. 6A and B show scanning electron microscope (SEM) imaging of a fiber-reinforced membrane in accordance with the present invention having a lithium-ion conducting glass coated on its surface before (6A) and after (6B) swelling in electrolyte.
Figure 6B:
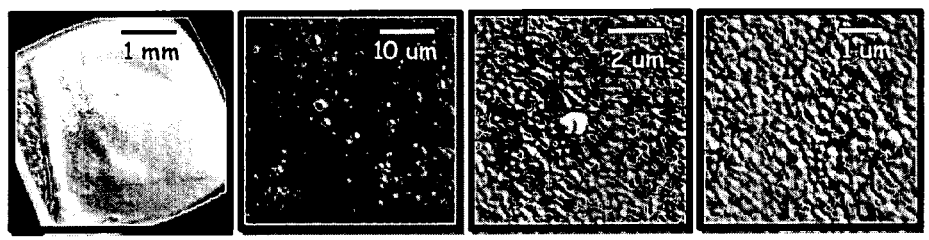

Samples of Gore-select membranes (PTFE reinforced Nafion per-fluoro-sulfonic acid polymer films of approximately 20 microns in thickness) obtained from W. L. Gore and Associates were coated with LiPON glass of approximately 0.4 microns thickness. The utility of a fiber re-enforced membrane to prevent swelling in the x-y (lateral) dimensions during solvent uptake, and add mechanical stability to a protective glass layer was then evaluated, as follows: The glass coated Gore select membranes were immersed in a solution of 90/10 vol % dimethoxyethane/dioxolane containing 0.5M lithium trifluorosulfonimide for approximately 2 hours. The membranes were then dried under vacuum and examined with a scanning electron microscope (SEM). FIGS. 6A and B show scanning electron microscope (SEM) imaging (at increasing magnification from left to right) of a fiber-reinforced membrane having a lithium-ion conducting glass coated on its surface before (6A) and after (6B) swelling in electrolyte. The SEM images illustrate that the glass does not crack after swelling of the membrane in electrolyte.

Notably, solution cast Nafion films that are not fiber-reinforced allow x-y expansion during solvent uptake, are not structurally supportive for the glass film, and consequently lead to severe cracking upon swelling in electrolyte.

Figure 7A:
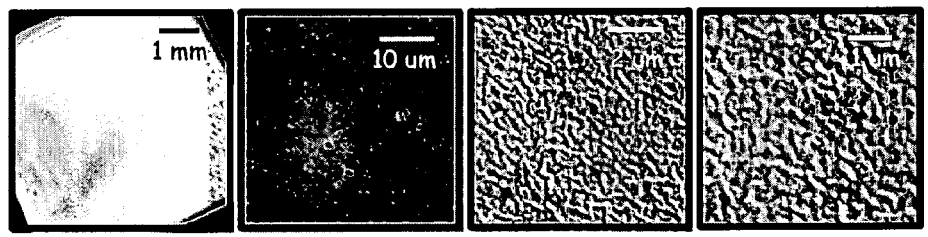
FIGS. 7A and B show scanning electron microscope (SEM) imaging of a non-fiber-reinforced membrane having a lithium-ion conducting glass coated on its surface before (7A) and after (7B) swelling in electrolyte.
Figure 7B:
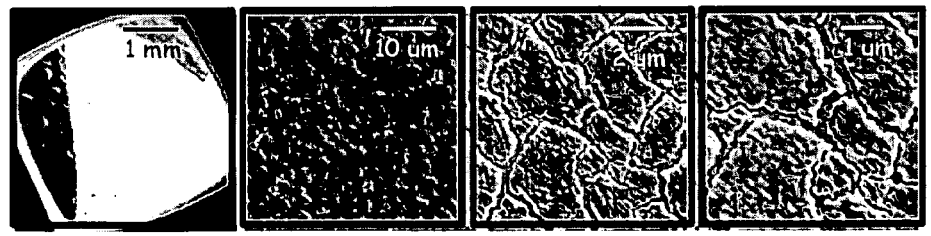

Nafion membranes of approximately 20 microns in thickness were cast from a 5 Wt % Nafion solution obtained from Aldrich Chemical Corporation. These membranes did not have fiber reinforcement. The cast membranes were dried and then coated with approximately 0.4 microns of LiPON glass. The glass coated membranes were then immersed in a solution of 90/10 vol % dimethoxyethane/dioxolane containing 0.5M lithium trifluorosulfonimide for approximately 2 hours. The membranes were then dried under vacuum and examined with a scanning electron microscope (SEM). FIGS. 7A and B show SEM imaging (at increasing magnification from left to right) of a non-fiber-reinforced membrane having a lithium-ion conducting glass coated on its surface before (7A) and after (7B) swelling in electrolyte. The SEM images illustrate that the glass on the non-reinforced membrane was severely cracked by the swelling process.

Example 2

Electrochemical Properties

Figure 8:
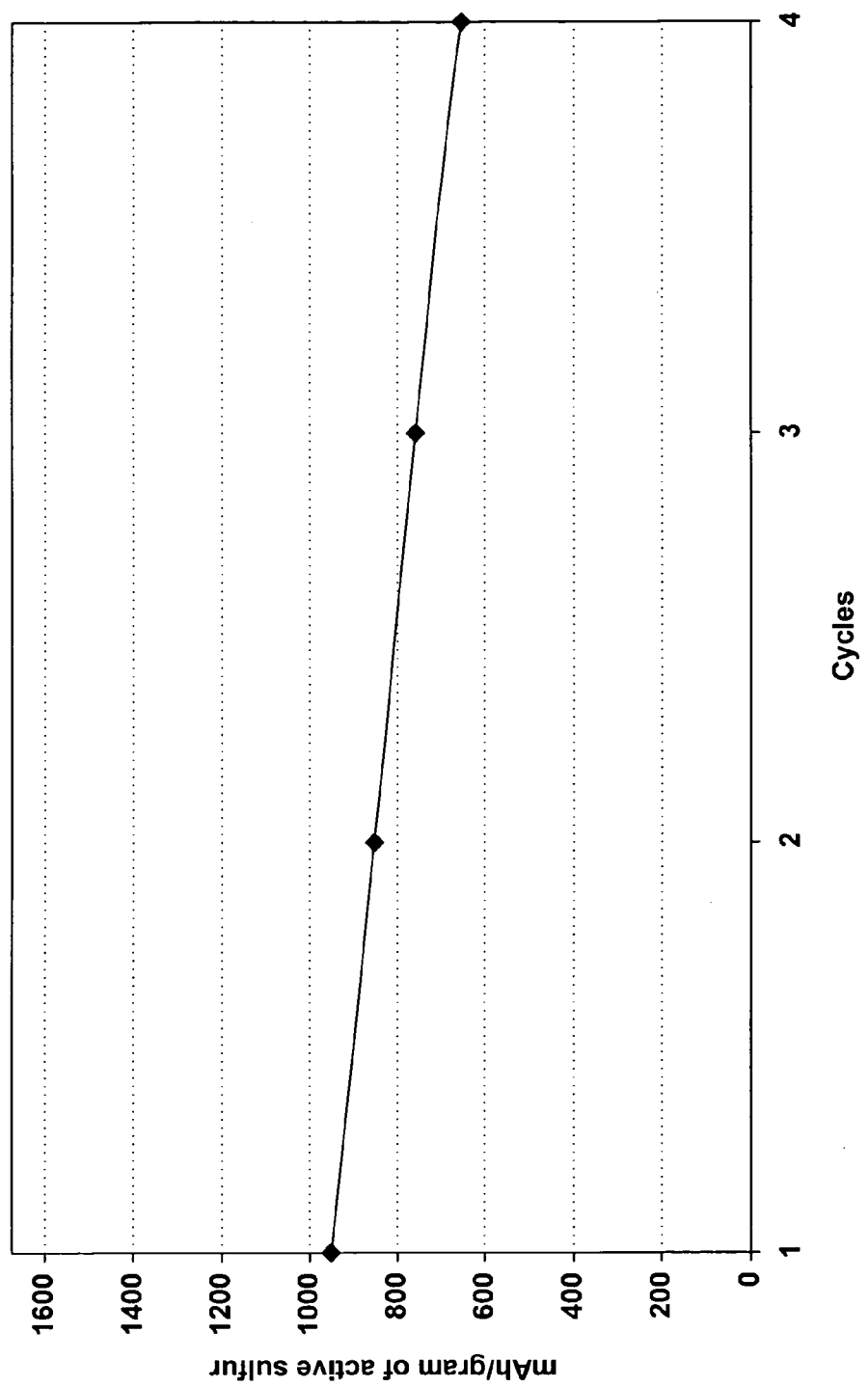
FIG. 8 depicts a graph of capacity versus cycles for a lithium anode protected by a glass layer coated on a reinforced ionomeric membrane.

In order to demonstrate that dimensionally stable membranes in accordance with the present invention can be used to fabricate functional electrochemical cells, glass coated Gore Select membranes were laminated onto lithium foil (Cypress Foote) and tested in laboratory cells. The cathode was a high surface area carbon black impregnated into a carbon fiber paper (Technical Fiber Products). Active sulfur was loaded into the cells as dissolved polysulfide species in a liquid electrolyte. The cells were tested at 250 uA/cm$^2$ for both discharge and charge. The result, depicted graphically in FIG. 8, demonstrates that lithium foil laminated with an ion-conducting glass that was coated onto a reinforced membrane is capable of reversible redox in a Li—S cell.

CONCLUSION

The present invention provides electrochemical device separator structures, and methods for their fabrication, which include a substantially impervious active metal ion conducting barrier layer material, such as an ion conducting glass, is formed on an active metal ion conducting membrane in which elongation due to swelling on contact with liquid electrolyte is constrained in at least two of three orthogonal dimensions of the membrane. The non-swelling character of the membrane prevents elongation in the x-y (or lateral, relative to the layers of the composite) orthogonal dimensions of the membrane when it is contacted with liquid electrolyte that would otherwise cause the barrier layer to rupture.

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. Accordingly, the present embodiments are to be considered as illustrative and not restrictive, and the invention is not to be limited to the details given herein, but may be modified within the scope and equivalents of the appended claims.

All references cited herein are incorporated by reference for all purposes.

What is claimed is:

1. A method of fabricating a battery cell structure, comprising:

forming a barrier layer on a substrate layer of a membrane material, the barrier layer being substantially impervious to liquid electrolyte, the membrane material characterized in that elongation due to swelling on contact with liquid electrolyte is constrained in at least two of three orthogonal dimensions of the material, the membrane material being selected from the group consisting of a fiber-reinforced polymer and a polymer reinforced with a punched, woven or mesh material;

forming an active metal negative electrode on the barrier layer; and assembling the negative electrode/barrier/membrane laminate structure with a cathode and a liquid electrolyte in a cell container;

wherein said membrane material layer and said barrier layer are conductive to ions of an active metal.

2. The method of claim 1, wherein the membrane material is a fiber-reinforced polymer.

3. The method of claim 2, wherein the polymer is ionomeric.

4. The method of claim 3, wherein the polymer is a per-fluoro-sulfonic acid polymer film.

5. The method of claim 2, wherein the fiber reinforcement comprises a material selected from the group consisting of polytetrafluoroethylene, polyethylene, polypropylene and polyethylene terephthalate.

6. The method of claim 2, wherein the membrane material layer has a thickness of about 20 microns.

7. The method of claim 1, wherein the barrier layer is a glass layer that includes at least one of a lithium silicate, a lithium borate, a lithium aluminate, a lithium phosphate, a lithium phosphorus oxynitride, a lithium silicosulfide, a lithium borosulfide, a lithium aluminosulfide, a lithium phosphosulfide, a lithium germanium sulfide, a lithium gallium sulfide, or a lithium phosphosilicosulfide.

8. The method of claim 1, wherein the membrane material is a polymer reinforced with a punched, woven or mesh material.

9. The method of claim 1, wherein the barrier layer is deposited onto the membrane layer.

10. The method of claim 1, wherein the active metal is lithium and the lithium is evaporated onto the barrier layer.

11. The method of claim 4, wherein the per-fluoro-sulfonic acid polymer film is represented by the formula:

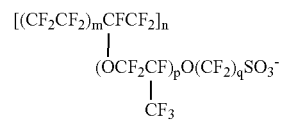

m ~ 5-10
n ~ 600-1500
p ~ 0-2
q ~ 1-4

12. The method of claim 4, wherein the per-fluoro-sulfonic acid polymer film is represented by the formula:

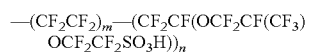

where m is 5 to 10, and n is up to 1000.

13. The method of claim 2, wherein the fiber reinforcement comprises polytetrafluoroethylene (PTFE).

14. The method of claim 2, wherein the membrane material layer has a thickness of between about 20 and 100 microns.

15. The method of claim 1, wherein the barrier layer is lithium phosphorus oxynitride (LiPON).

16. The method of claim 1, wherein the barrier layer is a glass layer having a thickness of between about 50 angstroms and 5 micrometers.

17. The method of claim 1, wherein the barrier layer has an ionic conductivity of between about $10^{-8}$ and about $10^{-2}$ $(\text{ohm-cm})^{-1}$.

18. The method of claim 8, wherein the polymer is ionomeric.

19. The method of claim 1, wherein the active metal is selected from the group consisting of lithium, sodium, potassium, and alloys thereof.

20. The method of claim 1, wherein the active metal is lithium.

21. The method of claim 1, wherein the cathode is provided on the membrane opposite the barrier layer and negative electrode.

22. The method of claim 1, wherein the cathode is an active sulfur electrode.

23. The structure of claim 1, wherein the liquid electrolyte comprises a glyme.

* * * * *